Patented Feb. 5, 1946

2,394,520

UNITED STATES PATENT OFFICE 2,394,520

NITRILES AND METHOD OF MAKING THE SAME

Joy G. Lichty, Stow, Ohio, assignor to Wingfoot Corporation, Akron, Ohio, a corporation of Delaware No Drawing. Application May 6, 1941,
Serial No. 392,129

7 Claims. (Cl. 260—464)

This invention relates to a new class of compounds and to methods of preparing the same. More particularly, it relates to acyloxy halo alkyl nitriles and methods of preparing them.

In the course of investigations looking to the preparation of various unsaturated compounds suitable for polymerization by themselves or with other unsaturated compounds to yield useful plastic masses, it has been found that alpha acetoxy chloroisobutyronitrile gives up a molecule of acetic acid to leave an unsaturated chloro compound which can be readily polymerized. Thus, pyrolysis results in the production of alpha chloromethylacrylonitrile in accordance with the following equation:

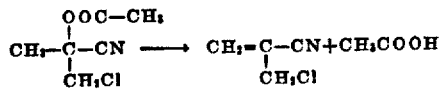

This starting compound can be prepared from monochloroacetone by treatment with hydrogen cyanide and subsequent acetylation.

The method may also be employed to prepare other compounds of similar type, generally denominated alpha acyloxy alpha (haloalkyl) aliphatic nitriles, a halogenated ketone, such as a chloro ketone or a bromo ketone, being treated with hydrogen cyanide and then acylated to introduce the radical of the desired carboxylic acid. The compounds of this class have not been heretofore described and are believed to be new.

The method of preparation is illustrated by the following examples.

Example 1

A 305 gram portion of mono chloro acetone containing 0.5 gram of sodium cyanide was treated with hydrogen cyanide until the increase in weight was 94 grams. This product was acetylated by adding gradually 374 grams of acetic anhydride containing 2 cc. of concentrated sulfuric acid. The temperature was maintained between 90–100° C. Thereafter, the acetic acid which is formed and excess anhydride were removed by distillation. Continued distillation gave 252 grams of a product boiling, in the main, at 122° C./24 mm. This represents a yield of 66% of the desired alpha acetoxy chloroisobutyronitrile. A residue, believed to be alpha chloromethyl, alpha acetoxy propion acetimide was also obtained as a solid which melted, on recrystallization, at 92° C. Lower acetylating temperatures produce less of the high boiling product.

The reactions involved are represented by the following equations:

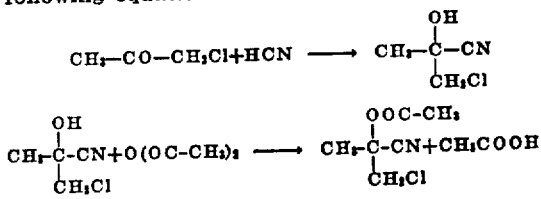

Example 2

A total of 172 grams of hydrogen cyanide was added slowly, with cooling, to 639 grams of chloroethyl methyl ketone. Approximately 10 grams of sodium cyanide was added intermittently. This mixture, after standing overnight, was filtered to remove the salt. The filtrate, containing the cyanohydrin of the chloroethyl methyl ketone, was acetylated by adding it gradually to a solution of 3 cc. of concentrated sulfuric acid in 642 grams of acetic anhydride, the temperature being kept at 90–100° C. and the mixture being stirred. A temperature of 100° C. was maintained for 1½ hours after the addition of the cyanohydrin. Distillation yielded 870 grams of a product boiling, in the main, at 108–115° C./6 mm., representing a yield of 82.5%. The residue weighed 162 grams and consisted for the most part of alpha-acetoxy-alpha (1-chloroethyl) propion acetimide. The yields of the desired product may be increased by using acetyl chloride or ketene as the acetylating agent in place of acetic anhydride.

The reaction may be applied to the preparation of numerous other alpha acyloxy alpha (halo alkyl) aliphatic nitriles by reaction of the appropriate halo ketone, after conversion to the cyanhydrin, with the anhydride, acid chloride or ketene corresponding to the carboxylic acid radical which it is desired to substitute in the intermediate cyanhydrin. Thus, mono bromo acetone may be treated with hydrogen cyanide and acetic anhydride to give alpha acetoxy, alpha bromomethyl propionitrile and methyl alpha chloroethyl ketone may be similarly treated to yield alpha acetoxy, alpha chloroethyl propionitrile.

Other halo ketones which may be so treated to produce still other alpha halo acyloxy alpha (haloalkyl) aliphatic nitriles are methyl beta chloroethyl ketone, ethyl chloromethyl ketone, ethyl alpha chloroethyl ketone, ethyl beta chloroethyl ketone, propyl chloromethyl ketone, alpha chloropropyl methyl ketone, and ethyl bromomethyl ketone. It will be apparent that the list could be extended to include additional halo ketones but the foregoing are believed to be sufficiently illustrative.

The acetoxy nitriles are the most easily prepared and constitute the preferred group within the general scope of the invention but other acid radicals may be introduced into cyanohydrins formed from various halo ketones. Thus, there may be prepared alpha propoxy, alpha butoxy, alpha benzoxy, and other alpha (haloalkyl) aliphatic nitriles. Chlorine will, of course, be the most usual halogen present but bromo compounds may be prepared in a similar manner by following the above described procedure. Also, in general, the propionitriles, substituted in the alpha position, as indicated, give the most promise of utility in the preparation of unsaturated compounds but nitriles having longer chains are also contemplated.

As indicated, the process is carried out in two steps, the cyanohydrin of the halogenated ketone first being formed by addition of hydrogen cyanide, preferably at a temperature below 80° C. and this cyanohydrin then being reacted with a compound which substitutes an acyloxy group in place of the hydroxyl of the cyanohydrin. The addition of the hydrogen cyanide is promoted by the presence of a basic catalyst, such as sodium cyanide or other alkali metal cyanide, sodium hydroxide, piperidine, trimethyl amine, cyclohexyl amine, and the like. The introduction of the acyloxy group may be effected by treating the cyanohydrin with the anhydride of the acid corresponding to the radical to be introduced, such as the introduction of an acetoxy group by means of acetic anhydride, the temperature ranging between about 45° and 110° C. Better yields may be obtained, however, by employing the acid chloride, such as acetyl chloride, or the ketene, such as ketene CH$_2$=CO, itself, in the case of acetic acid. Other ketones may be employed for the introduction of other acid groups, methyl ketene and dimethyl ketene being mentioned.

While there have been described above the preferred embodiments of the invention, it will be apparent to those skilled in the art that various modifications and changes may be made therein without departing from the spirit of the invention or from the scope of the appended claims.

I claim:

1. Alpha acetoxy, alpha chloromethyl propionitrile.

2. Alpha acetoxy, alpha chloroethyl propionitrile.

3. A method of preparing alpha acetoxy, alpha (chloroalkyl) propionitriles which comprises treating a mono chloroketone with hydrogen cyanide in the presence of an alkali metal cyanide and then reacting the cyanohydrin so formed with acetyl chloride.

4. A new chemical compound having the molecular structure:

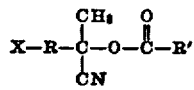

in which X is a halogen atom, R is an alkylene radical, and R' is an alkyl radical.

5. A new chemical compound having the molecular structure:

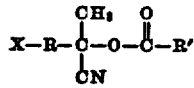

in which X is a halogen atom, R is an alkylene radical, and R' is an alkyl radical containing from one to three carbon atoms.

6. A new chemical compound having the molecular structure:

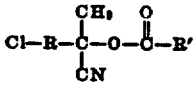

in which R is an alkylene radical and R' is an alkyl radical.

7. A new chemical compound having the molecular structure:

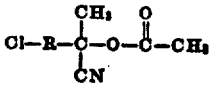

in which R is an alkylene radical.

JOY G. LICHTY.

Certificate of Correction

Patent No. 2,394,520.　　　　　　　　　　　　　　　　　　February 5, 1946.

JOY G. LICHTY

It is hereby certified that error appears in the printed specification of the above numbered patent requiring correction as follows: Page 2, first column, line 42, for "ketones" read *ketenes*; and that the said Letters Patent should be read with this correction therein that the same may conform to the record of the case in the Patent Office.

Signed and sealed this 7th day of May, A. D. 1946.

[SEAL]

LESLIE FRAZER,
*First Assistant Commissioner of Patents.* monomethyl ketone. It will be apparent that the list could be extended to include additional halo ketones but the foregoing are believed to be sufficiently illustrative.

The acetoxy nitriles are the most easily prepared and constitute the preferred group within the general scope of the invention but other acid radicals may be introduced into cyanohydrins formed from various halo ketones. Thus, there may be prepared alpha propoxy, alpha butoxy, alpha benzoxy, and other alpha (haloalkyl) aliphatic nitriles. Chlorine will, of course, be the most usual halogen present but bromo compounds may be prepared in a similar manner by following the above described procedure. Also, in general, the propionitriles, substituted in the alpha position, as indicated, give the most promise of utility in the preparation of unsaturated compounds but nitriles having longer chains are also contemplated.

As indicated, the process is carried out in two steps, the cyanohydrin of the halogenated ketone first being formed by addition of hydrogen cyanide, preferably at a temperature below 80° C. and this cyanohydrin then being reacted with a compound which substitutes an acyloxy group in place of the hydroxyl of the cyanohydrin. The addition of the hydrogen cyanide is promoted by the presence of a basic catalyst, such as sodium cyanide or other alkali metal cyanide, sodium hydroxide, piperidine, trimethyl amine, cyclohexyl amine, and the like. The introduction of the acyloxy group may be effected by treating the cyanohydrin with the anhydride of the acid corresponding to the radical to be introduced, such as the introduction of an acetoxy group by means of acetic anhydride, the temperature ranging between about 45° and 110° C. Better yields may be obtained, however, by employing the acid chloride, such as acetyl chloride, or the ketene, such as ketene $CH_2=CO$, itself, in the case of acetic acid. Other ketones may be employed for the introduction of other acid groups, methyl ketene and dimethyl ketene being mentioned.

While there have been described above the preferred embodiments of the invention, it will be apparent to those skilled in the art that various modifications and changes may be made therein without departing from the spirit of the invention or from the scope of the appended claims.

I claim:

1. Alpha acetoxy, alpha chloromethyl propionitrile.

2. Alpha acetoxy, alpha chloroethyl propionitrile.

3. A method of preparing alpha acetoxy, alpha (chloroalkyl) propionitriles which comprises treating a mono chloroketone with hydrogen cyanide in the presence of an alkali metal cyanide and then reacting the cyanohydrin so formed with acetyl chloride.

4. A new chemical compound having the molecular structure:

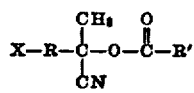

in which X is a halogen atom, R is an alkylene radical, and R' is an alkyl radical.

5. A new chemical compound having the molecular structure:

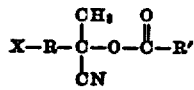

in which X is a halogen atom, R is an alkylene radical, and R' is an alkyl radical containing from one to three carbon atoms.

6. A new chemical compound having the molecular structure:

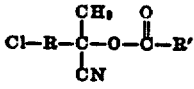

in which R is an alkylene radical and R' is an alkyl radical.

7. A new chemical compound having the molecular structure:

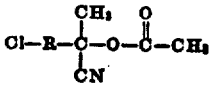

in which R is an alkylene radical.

JOY G. LICHTY.

Certificate of Correction

Patent No. 2,394,520. February 5, 1946.

JOY G. LICHTY

It is hereby certified that error appears in the printed specification of the above numbered patent requiring correction as follows: Page 2, first column, line 42, for "ketones" read *ketenes*; and that the said Letters Patent should be read with this correction therein that the same may conform to the record of the case in the Patent Office.

Signed and sealed this 7th day of May, A. D. 1946.

[SEAL]

LESLIE FRAZER,
*First Assistant Commissioner of Patents.*